United States Patent [19]

Golden et al.

[11] Patent Number: 4,957,514
[45] Date of Patent: Sep. 18, 1990

[54] HYDROGEN PURIFICATION

[75] Inventors: Timothy C. Golden; Ravi Kumar, both of Allentown; Wilbur C. Kratz, Macungie, all of Pa.

[73] Assignee: Air Products and Chemicals, Inc., Allentown, Pa.

[21] Appl. No.: 307,438

[22] Filed: Feb. 7, 1989

[51] Int. Cl.$^5$ .............................................. B01D 53/04
[52] U.S. Cl. ........................................ 55/26; 55/31; 55/33; 55/62; 55/68; 55/75
[58] Field of Search .................. 55/25, 26, 31, 33, 35, 55/62, 68, 75

[56] References Cited

U.S. PATENT DOCUMENTS

| Re. 31,014 | 8/1982 | Sircar | 55/75 X |
|---|---|---|---|
| 2,882,244 | 4/1959 | Milton | 55/75 X |
| 3,011,589 | 12/1961 | Meyer | 55/75 X |
| 3,078,635 | 2/1963 | Milton | 55/35 |
| 3,078,639 | 2/1963 | Milton | 55/68 |
| 3,111,387 | 11/1963 | Avery et al. | 55/75 X |
| 3,140,932 | 7/1964 | McKee | 55/68 |
| 3,150,942 | 9/1964 | Vasan | 55/31 |
| 3,313,091 | 4/1967 | Berlin | 55/58 |
| 3,720,042 | 3/1973 | Simonet | 55/75 X |
| 3,723,561 | 3/1973 | Priegnitz | 55/75 X |
| 3,838,553 | 10/1974 | Doherty | 55/68 X |
| 3,885,927 | 5/1975 | Sherman et al. | 55/75 X |
| 4,171,206 | 10/1979 | Sircar | 55/26 |
| 4,477,267 | 10/1984 | Reiss | 55/75 X |
| 4,557,736 | 12/1985 | Sircar et al. | 55/75 X |
| 4,765,808 | 8/1988 | Oigo et al. | 55/68 |
| 4,775,396 | 10/1988 | Rastelli et al. | 55/68 X |

*Primary Examiner*—Robert Spitzer
*Attorney, Agent, or Firm*—Geoffrey L. Chase; James C. Simmons; William F. Marsh

[57] ABSTRACT

Dilute impurities are removed from a hydrogen stream by selective adsorption in a bed of an X-type zeolite comprising barium cation.

9 Claims, 1 Drawing Sheet

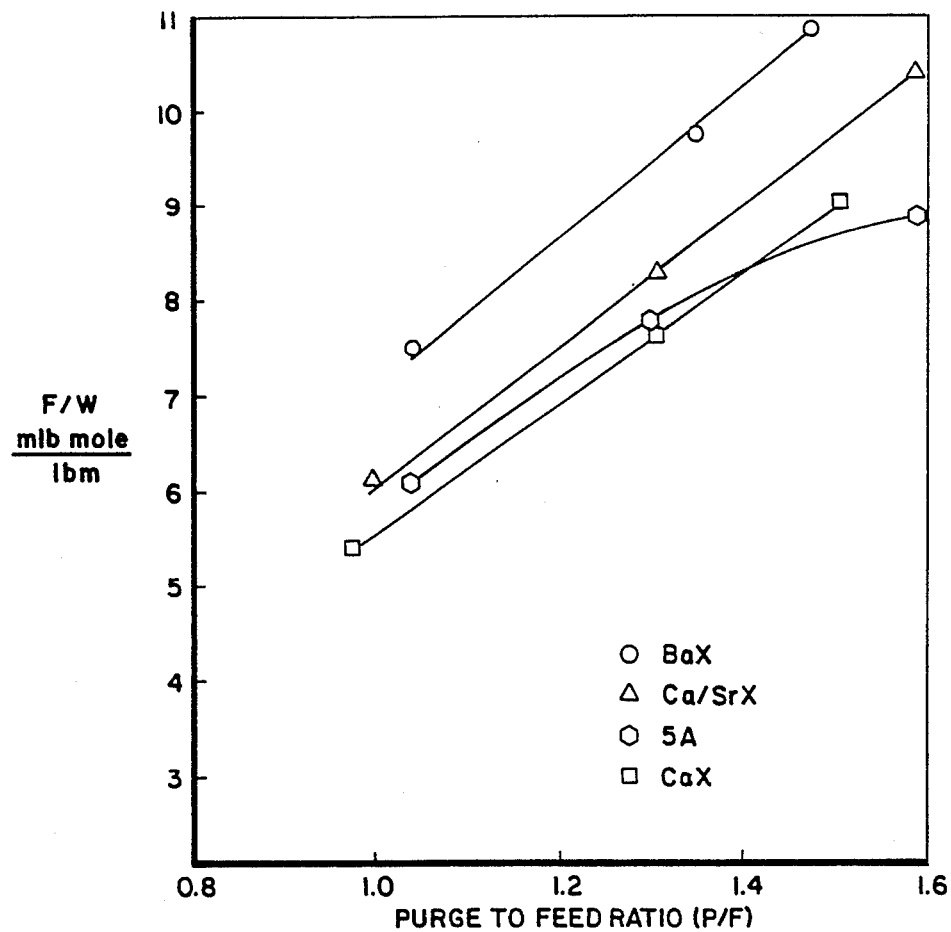

HYDROGEN PURIFICATION

TECHNICAL FIELD

The present invention relates to the separation of components of gas mixtures by selective adsorption and is more particularly concerned with improvements in the removal of dilute components present in a crude hydrogen gas stream.

BACKGROUND OF THE INVENTION

Multicomponent gas mixtures containing hydrogen as a bulk primary component, a bulk secondary component and one or more dilute components are frequently encountered in industrial separation. A typical and widely adopted commercial source for the production of hydrogen is by reforming of natural gas or other methane-rich hydrocarbon stream. The reforming is carried out by reacting the hydrocarbon with steam and/or with a molecular oxygen-containing gas (e.g. air or oxygen-enriched air), producing a hydrogen gas stream containing accompanying minor amounts of oxides of carbon, residual methane and in some instances also nitrogen. Unless it is desired to recover the carbon monoxide for a designed use, it is customarily converted to carbon dioxide by water gas shift reaction. Bulk removal of carbon dioxide from the crude hydrogen stream may be effected by selective absorption in a physical solvent such as aqueous ethanolamines or alkali metal carbonates. To obtain high purity hydrogen the remaining dilute components are then removed by any of a variety of methods known to the art, among which are included selective adsorption in a pressure swing system (PSA) employing as adsorbent molecular sieve, most commonly a commercially available type 5A sieve.

PRIOR ART

U.S. Pat. No. 4,171,206 (assigned to applicant's assignee) cites a number of earlier prior art patents concerned with recovery of hydrogen from gaseous mixtures. The advocated method of the '206 patent involves passing the crude hydrogen stream (such as the gaseous effluent from a shift converter of a hydrocarbon reforming plant) through a first adsorbent bed (A) effective in selective retention of carbon dioxide and water vapor, and then through a second adsorbent bed (B) for removal of dilute impurities such as CO, $N_2$ and $CH_4$, with recovery of high purity hydrogen (99.9+% $H_2$). The preferred adsorbent used in the A bed is activated carbon; for the B bed a combination of activated carbon and 5A molecular sieve zeolite is recommended.

An earlier U.S. Pat. No. 3,150,942 discloses the purification of a crude hydrogen gas stream containing carbon dioxide as the major contaminant and CO, $N_2$ and $CH_4$ as minor contaminants. The crude gas is passed in series through a first adsorbent bed of 13X molecular sieve for the removal of water and $CO_2$ and then after cooling the gas stream is passed through a second adsorbent bed of 4A or 5A molecular sieve, wherein CO, $N_2$ and $CH_4$ are adsorbed. Regeneration of both beds is effected by heating and purging.

U.S. Pat. No. 3,078,639 is directed to the separation of $CO_2$ from a vapor stream containing $CO_2$ and methane or other hydrocarbon. The patent process employs X type molecular sieve in its common sodium form or wherein part or all of the sodium has been replaced by ion exchange with other cations. The patent tabulates the adsorbent capacities of sodium X (NaX) as compared to KX, BaX, CaX, MnX and other cation-exchanged NaX sieves at various temperatures and pressures, for individual adsorption of $CO_2$ as compared to $H_2$, CO, $N_2$ and low molecular weight hydrocarbons. The patent concludes that X zeolites possess an extremely strong selectivity for $CO_2$ to the substantial exclusion of hydrocarbons, hydrogen, nitrogen and CO. No distinction is drawn between sodium X zeolite as such and X zeolites in which sodium has been replaced by an alkaline earth or other metal cation. A companion patent, U.S. Pat. No. 3,078,635 is directed to the use of NaX in the removal of water vapor from various vapor streams. The adsorbent capacity of the sodium X zeolite is compared to that of other X type zeolites in which Na cation is replaced by Ca, Mg and Ba at various temperatures and pressures.

According to U.S. Pat. No. 3,140,932, cation substituted zeolite X molecular sieve is employed in separation of nitrogen from oxygen. The capacities of several of the cation-exchanged X sieves at different degrees of base exchange are reported for Mg, Ca, Sr, Ba and Ni; the highest capacity is shown by calcium-substituted A type sieve, while the highest selectivity for $N_2/O_2$ separation ($\alpha$ separation factor) is displayed by BaX.

U.S. Pat. No. 3,313,091 discloses the use of strontium substituted type X molecular sieve for selective adsorption of nitrogen from air to obtain oxygen-enriched air.

A recently issued patent, U.S. Pat. No. 4,765,808, discloses the use of barium-exchanged sodium zeolite (60 to 80% of Na ion exchanged by Ba) in the separation of nitrogen from oxygen, the removal of water vapor and carbon dioxide from atmospheric air, and in the separation of carbon monoxide from nitrogen. The patent recognizes that although some forms of barium exchanged NaX type zeolites have been earlier proposed (as early as 1959), these have not been employed to significant extent in industrial applications. On the other hand, while sodium X zeolite has found use as an industrial adsorbent for certain gas separation or removal applications, it is not a satisfactory adsorbent for other particular operations such as the separation of carbon dioxide from nitrogen and in the separation of oxygen and nitrogen of atmospheric air.

While in certain of the above-cited and other prior art publications the use of X in sodium or cation-exchanged form is suggested for use as adsorbent in gas separation operations, the adsorbent selected in industry for separation of dilute components from a hydrogen-rich stream is 5A type zeolite, which is that obtained by base exchange of Ca for (about 75%) of the sodium ion in sodium zeolite A (4A). The wide use of 5A molecular sieve adsorbent can be attributed to its commercial availability and relatively low pricing coupled with acceptable performance in these industrial applications, for which reasons very little effort has been applied to investigation of improved adsorbents for use in processes for removal of dilute components from a hydrogen-rich gas mixture. Moreover, as seen from the patents above reviewed and other similar prior art disclosures, the use of X type zeolite in sodium form or other base-exchanged form is contraindicated for selective removal of such impurities as methane, carbon monoxide and nitrogen, when present in dilute concentration in a hydrogen-rich gas stream.

In known processes for hydrogen purification, as described for example in cited U.S. Pat. No. 4,171,206, following bulk removal of water and $CO_2$ from a crude hydrogen stream by selective adsorption or other known techniques, the hydrogen-rich effluent (90% + $H_2$) still contains one or more impurities such as CO, $CH_4$, $N_2$. When further purification of the hydrogen is performed by adsorption of these impurities from the hydrogen stream, these adsorbed impurities must be removed from the adsorbent, which is accomplished by pressure reduction and/or purging the impurity-laden adsorbent bed with part of the recovered high purity hydrogen, thus reducing the overall hydrogen recovery.

SUMMARY OF THE INVENTION

The present invention maximizes recovery of hydrogen in processes for hydrogen purification by selective adsorption of impurities therefrom. This is attained, in accordance with the invention, by use of a barium-exchanged sodium X zeolite as a selective adsorbent for the impurities contained in dilute concentration in a hydrogen stream.

BRIEF DESCRIPTION OF THE DRAWINGS

In the figure of the accompanying drawing a series of curves are plotted depicting variations in the amount of feed gas per unit weight of adsorbent (F/W) as a function of purge to feed ratio (P/F) for different adsorbents.

DETAILED DESCRIPTION

Practice of the invention is not limited to any particular PSA system for effecting the desired removal of dilute components to purify the hydrogen stream. While not limited thereto, the invention is utilized to best advantage in the purification of a gas stream of high hydrogen content in the order of 90% or more $H_2$ (by volume). For the indicated purpose the performance of barium substituted X-type molecular sieve has been unexpectedly found to be unique, since the high capacity and selectivity displayed by the BaX molecular sieve is not had in alkali metal A-type nor X-type zeolites nor in such zeolites in which all or part of the sodium cation is partially or entirely substituted solely by calcium or any alkaline earth metal cation other than Ba.

As hereinabove indicated, hydrogen gas streams commonly encountered in industry contain dilute contaminants such as carbon monoxide, methane and nitrogen, most of the water vapor and carbon dioxide contents having been previously removed by any of the known bulk separation techniques. To obtain a high purity hydrogen product (99.9% + $H_2$) in practice of the present invention, the contaminate-containing hydrogen feed is passed at superatmospheric pressure through a bed of barium-exchanged NaX zeolite of a multibed PSA system until or short of breakthrough of contaminant at the exit end of the bed. During this adsorption step hydrogen of high purity (99.9% +) is discharged as an unsorbed primary effluent. At the conclusion of this adsorption step the feed stream is switched to another bed of the BaX zeolite, while the sorbent-laden bed is regenerated.

Regeneration of the bed is accomplished by first reducing the bed pressure by gas withdrawal to about ambient pressure level, followed by rinsing the bed with part of the recovered high purity hydrogen. The rinsed bed is then brought back to designed superatmospheric pressure level for repetition of the cycle.

Although not limited thereto, the purification of the hydrogen stream in accordance with the invention is preferably carried out in a multibed PSA system such as described in U.S. Pat. No. 4,171,206. In the system of that patent initial bulk removal of carbon dioxide and water vapor from a crude hydrogen gas stream is performed in a first bed of adsorbent designated A, followed by further purification of the unsorbed effluent to remove other remaining contaminants in a second adsorbent bed (B) in series with the first. Instead of the adsorbent designated by the patent for use in the B beds, in practice of the present invention, BaX zeolite is employed. The operating sequence may be the same as that disclosed in the '206 patent, pertinent portions of which disclosure are herein incorporated by reference.

The preferred BaX zeolite for use in practice of the present invention is one in which 60 to 100% of the sodium cation of a NaX zeolite has been replaced by Ba ion. Such base-exchanged zeolites can be prepared from NaX beads by the standard soaking procedure using $BaCl_2$ solution for exchange, or BaX zeolite powder may be made into granules or pellets of 0.5 to 3.0 mm diameter by incorporating with 10–20% of binder material.

While the preferred adsorbent for practice of the invention is X zeolite having 60–100% barium and 40–0% sodium cation, one may employ BaX-containing zeolites in which up to 40% of the divalent cation is Sr.

To determine the performance characteristics of the BaX zeolites as compared to other adsorbents for purification of hydrogen streams contaminated with CO, $CH_4$ and $N_2$, a series of runs were made under similar operating conditions. It was found that at the same pure hydrogen production rate, the use of the BaX zeolite (96% exchanged for Na) as the B bed adsorbent in a multibed PSA system, obtained 1.5 to 2% greater $H_2$ recovery.

A number of adsorbents were tested in the laboratory employing a single column of 1 inch diameter filled to 6 feet length with the adsorbent. The feed mixture, comprised (by volume) of 95% hydrogen and 5% $CH_4$, was passed through the column at a pressure of 18 atmospheres. Breakthrough of $CH_4$ was used as the criterion in these runs, since it shows breakthrough before that of CO. These runs were operated until the average $CH_4$ concentration in the product was 5–10 ppm. The column was then depressurized and the adsorbent regenerated by purge with the product hydrogen stream. After repressurization with the product stream the adsorption step was restarted. These experiments were carried out in a cyclic manner until steady state was reached. The results of these cyclic experiments are plotted in FIG. 1, comparing BaX (96% Ba, 4% Na), CaX (98% Ca, 2% Na), Ca/SrX (50% Ca, 50% Sr), and commercial 5A.

As seen from FIG. 1 of the accompanying drawing, BaX zeolite processes more feed gas per unit weight of adsorbent at a given P/F ratio (purge to feed) than any of the other adsorbents tested. In other words a smaller bed of BaX can achieve the same separation as these other adsorbents. Because of the reduced bed size with consequent smaller void volume less hydrogen is lost during final depressurization in regeneration of the adsorbent bed.

The significance of the experimental results plotted in FIG. 1 may be more fully appreciated from the following considerations. To process a given amount of feed each adsorbent requires a given P/F ratio. For example, if it is desired to process 8 milli pound moles of feed gas per pound mass of adsorbent, BaX requires a P/F ratio of about 1.1 as compared to 1.3 required when using 5A (the adsorbent currently employed for this service). Also the reduction in the amount of hydrogen needed for purge of the bed results in an increase in amount of hydrogen actually recovered.

A series of pilot plant runs were carried out in a PSA unit conforming to that of U.S. Pat. No. 4,171,206, using as the B bed adsorbent BaX (96% Ba 4% Na) for comparison with results obtained using commercial 5A zeolite. Under similar conditions of operation 1.5 to 2.0% greater hydrogen recovery was had using BaX than that obtained with the 5A zeolite.

The pilot plant runs were conducted in a PSA system employing the cycle described in the cited '206 patent, having a B bed 2 inches in diameter by 12 feet in length. The bed contained 2 feet of NaX zeolite at the feed end followed by 10 feet of commercial 5A zeolite. The feed gas composition comprised initially 72.6% $H_2$, 18.2% $CO_2$, 0.4% CO, 8.7% $CH_4$ and 0.1% $N_2$. The gas was charged at a pressure of 296 psia at a temperature of 70° F., with production of a hydrogen effluent of 99.9996% $H_2$ purity at an $H_2$ recovery of 83.5%. A similar run was made in which the commercial 5A zeolite was replaced with the BaX zeolite, in which the initial feed gas composition comprised 74.9% $H_2$, 18.3% $CO_2$, 0.5% CO, 6.2% $CH_4$ and 0.2% $N_2$. The hydrogen recovery was 86.0% at an $H_2$ purity of 99.9988%.

Based on theoretical considerations alone it is to be expected that the most promising adsorbent for use in removal of dilute contaminant from a hydrogen stream would be one having the highest adsorption capacity for the dilute impurity to be removed. At the high adsorption (retention) capacity the volume of the adsorbent bed is minimized with consequent reduction in void losses. After the adsorption step, the adsorbed impurities need to be removed from the bed to regenerate the adsorbent, which is accomplished by pressure reduction and purging using recovered pure hydrogen as purge gas. The amount of purge gas needed to desorb a given impurity is directly proportional to its Henry's law constant. The smaller the Henry's law constant the easier the desorption and vice versa. Accordingly, one would be prompted to employ as adsorbent in PSA systems for removal of CO, $CH_4$ and $N_2$ from a hydrogen feed gas stream (such as occurs, for example, in the charge to the B beds of such PSA system) one having the highest possible adsorption capacity for these impurities at the inlet partial pressure of these, together with as small a Henry's law constant as possible. Since the relative effect of each of these criteria with respect to the overall hydrogen recovery could not be predicted a series of CO and $CH_4$ equilibrium adsorption isotherms were measured on various adsorbents.

The results are set out in Tables 1 and 2 below. The 5A adsorbent was the commercial product having 75% Ca and 25% Na. The CaX adsorbent is commercially available from Laporte Industries. The alkaline earth metal zeolites were prepared by ion exchange of $Sr^{2+}$ in CaX and BaX. Ca/SrX is composed of 50% Ca/50% Sr. BaSrX is composed of 70% Ba/30% Sr. $K_H$ is determined by measurement of equilibrium adsorption isotherms.

In addition to the calculated values reported in Tables 1 and 2 for the ratio of the adsorption capacity for a given diluent (CO and $CH_4$) at its initial partial pressure to Henry's Law constant ($n/K_H$), these tables also report the heats of adsorption (q). For the best performance it is desirable for the heat value to be as low as possible and still maintain sufficient adsorption capacity. The Henry's Law constant is exponentially dependent on heat of adsorption ($K_H = k$ exp. q/RT). Therefore, the lower the value of q, the lower $K_H$ and the higher $n/K_H$. This lower heat of adsorption means there is a weaker adsorption bond with the surface, which makes for more facile desorption by $H_2$ purge. However, if the heat of adsorption is too low, the adsorption capacity will also be too low. Thus, there is an optimum heat of adsorption above which a high hydrogen purge is needed and below which the adsorbent has insufficient capacity.

Based on the $n/K_H$ values in Tables 1 and 2 the tested adsorbents for CO adsorption rank in the order BaX>Ba/SrX>5A>SrX>Ca/SrX>CaX. For $CH_4$ adsorption, the adsorbents rank in the order BaX>Ba/SrX>5A>SrX>Ca/SrX>CaX.

Use of $n/K_H$ values is a qualitative measure of performance. Clearly, adsorbents with high capacity are not necessarily preferred. In addition, 5A and BaX have the same $K_H$ for $CH_4$, but BaX performs better. Furthermore, Ca/SrX has a lower $n/K_H$ value than 5A, but performs better (FIG. 1). Accordingly, it was not to be expected that the BaX adsorbent would perform better than the compared molecular sieve adsorbents in the removal of dilute impurities from a hydrogen stream.

TABLE 1

| Adsorbent | (mmole/g/atm) $K_H$ CO @ 30° C. | (mmole/g) nads CO, P = 0.2 atm | $n/K_H$ | (kcal/mol) q |
| --- | --- | --- | --- | --- |
| 5A | 6.6 | 0.42 | 0.064 | 8.3 |
| CaX | 32.0 | 0.88 | 0.028 | 9.0 |
| SrX | 12.1 | 0.76 | 0.063 | 7.8 |
| BaX | 2.6 | 0.37 | 0.14 | 6.3 |
| Ca/SrX | 15.1 | 0.76 | 0.050 | 8.4 |
| Ba/SrX | 7.2 | 0.66 | 0.092 | 7.0 |

TABLE 2

| Adsorbent | (mmole/g/atm) $K_H$ $CH_4$ @ 30° C. | (mmole/g) nads $CH_4$, P = 0.9 atm | $n/K_H$ | (kcal/mol) q |
| --- | --- | --- | --- | --- |
| 5A | 1.1 | 0.56 | 0.51 | 5.6 |
| CaX | 3.5 | 0.85 | 0.24 | 6.7 |
| SrX | 2.3 | 0.88 | 0.38 | 6.2 |
| BaX | 1.1 | 0.70 | 0.64 | 5.0 |
| Ca/SrX | 2.3 | 0.80 | 0.35 | 6.5 |
| Ba/SrX | 1.7 | 0.89 | 0.52 | 5.8 |

What is claimed is:

1. The pressure swing adsorption method of purifying an impure hydrogen gas stream containing a dilute contaminant of $CH_4$ which method comprises: passing said stream at superatmospheric pressure through an adsorbent bed of a zeolite obtained by replacing at least a portion of the sodium cation of sodium X-zeolite by barium ions to absorb said $CH_4$ contaminant and recovering purified hydrogen as unsorbed effluent, depressurizing the adsorbent bed, purging the adsorbent bed with product hydrogen and repressurizing the adsorbent bed with product hydrogen.

2. The method as defined in claim 1 wherein said zeolite is one obtained by replacing 60–80% of the sodium cation of said sodium X zeolite by barium ions.

3. The method as defined in claim 1 wherein said impure hydrogen gas stream is that obtained by first subjecting a crude hydrogen stream from hydrocarbon reforming to bulk separation to remove contained water vapor and carbon dioxide.

4. The method as defined in claim 1 wherein said zeolite is one having 0–40% sodium cation and up to 100% of barium cation.

5. The method as defined in claim 1 wherein said zeolite is one having approximately 30% to 40% strontium cation and up to 70% barium cation.

6. The method as defined in claim 1 wherein said impure hydrogen gas stream is that obtained by subjecting a carbon monoxide-containing hydrogen gas stream to a shift reaction to convert the carbon monoxide to the dioxide and treating the product of said shift reaction for removal of contained carbon dioxide therefrom.

7. The pressure swing adsorption method for separation and recovery of high purity hydrogen from a crude hydrogen gas stream containing water vapor and carbon dioxide as the principal impurities and a dilute amount of methane, which comprises the steps of:
   (a) passing said crude hydrogen stream at superatmospheric pressure through a first bed comprised of solid adsorbent, thereby removing contained carbon dioxide and water vapor;
   (b) then passing the effluent from said first bed through a second adsorbent bed comprised of a barium X-zeolite and discharging from said second bed unadsorbed hydrogen at high purity, said passing being continued for a controlled time period until or short of breakthrough of carbon dioxide from said first bed;
   (c) rinsing said first bed by flowing a stream of substantially pure carbon dioxide therethrough at substantially initial feed pressure level and for a controlled time period effective to purge most of the void and displaced gases from said first bed followed by pressure reduction and evacuation of the rinsed first bed;
   (d) reducing the pressure in the second bed by gas withdrawal to near ambient pressure level and rinsing said second bed with high purity hydrogen;
   (e) then restoring both said beds to initial superatmospheric pressure level by admission of substantially pure hydrogen thereto.

8. The method as defined in claim 7 wherein said barium X-zeolite corresponds to that in which the cationic component comprises 0 to 40% Na and 60–100% of an alkaline earth cation of barium in admixture with strontium.

9. The method as defined in claim 7 wherein said barium X zeolite corresponds to that in which the cationic component comprises 0 to 40% Na and 60–100% of Ba cation.

* * * * *